US012799976B2

(12) United States Patent
Hayashi

(10) Patent No.: US 12,799,976 B2
(45) Date of Patent: Nov. 17, 2026

(54) MOTION GUIDE APPARATUS

(71) Applicant: THK CO., LTD., Tokyo (JP)

(72) Inventor: Yuki Hayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 18/881,565

(22) PCT Filed: Jul. 3, 2023

(86) PCT No.: PCT/JP2023/024552
§ 371 (c)(1),
(2) Date: Jan. 6, 2025

(87) PCT Pub. No.: WO2024/009926
PCT Pub. Date: Jan. 11, 2024

(65) Prior Publication Data

US 2025/0215925 A1 Jul. 3, 2025

(30) Foreign Application Priority Data

Jul. 7, 2022 (JP) ................................ 2022-109426

(51) Int. Cl.
*F16C 29/06* (2006.01)

(52) U.S. Cl.
CPC ................................ *F16C 29/0611* (2013.01)

(58) Field of Classification Search
CPC .............. F16C 29/0611; F16C 29/0609; F16C 29/0633; F16C 29/0635; F16C 29/0638
See application file for complete search history.

(56) References Cited

U.S. PATENT DOCUMENTS 4,610,488 A * 9/1986 Geka .................... F16C 29/064 384/45
4,797,012 A 1/1989 Tanaka
(Continued)

FOREIGN PATENT DOCUMENTS

CN 114483783 A 5/2022
JP H01-126422 A 5/1989
(Continued)

OTHER PUBLICATIONS

International Search Report dated Sep. 12, 2023, issued in counterpart International Application No. PCT/JP2023/024552. (2 pages).
(Continued)

*Primary Examiner* — James Pilkington
(74) *Attorney, Agent, or Firm* — WHDA, LLP

(57) ABSTRACT

At least part of the three-dimensional trajectory of the turn portion is formed on the basis of a cross-sectional trajectory curve in an X-Z cross section of the motion guide apparatus, and a longitudinal trajectory curve drawn on a virtual plane VP where a longitudinal direction of the motion guide apparatus is a Y-axis, and a trajectory length ω from a turn start point A of the cross-sectional trajectory curve is a length ω of a W-axis. X and Z coordinates of the threedimensional trajectory are X and Z coordinates of the cross-sectional trajectory curve. A Y-coordinate of the threedimensional trajectory is a Y-coordinate of the longitudinal trajectory curve where the ω of the W-axis of the virtual plane VP is a variable.

2 Claims, 9 Drawing Sheets

(56) References Cited

U.S. PATENT DOCUMENTS

| | | | | |
|---|---|---|---|---|
| 5,909,965 | A * | 6/1999 | Szu | F16C 29/0609 384/43 |
| 7,600,918 | B2 * | 10/2009 | Shirai | F16C 29/0602 384/45 |
| 2001/0017951 | A1 | 8/2001 | Kamimura et al. | |
| 2022/0128091 | A1 | 4/2022 | Yamada et al. | |

FOREIGN PATENT DOCUMENTS

| | | | |
|---|---|---|---|
| JP | 2001-241437 | A | 9/2001 |
| JP | 2003-35314 | A | 2/2003 |
| JP | 2020-197296 | A | 12/2020 |
| TW | 200938745 | A | 9/2009 |

OTHER PUBLICATIONS

Office Action dated May 13, 2026, issued in counterpart TW Application No. 112125177. (7 pages).

Extended (Supplementary) European Search Report dated Jun. 2, 2026, issued in counterpart EP Application No. 23835458.3. (10 pages).

* cited by examiner (a)

(b)

COMPARATIVE EXAMPLE

COMPARATIVE EXAMPLE

MOTION GUIDE APPARATUS

CROSS-REFERENCE TO RELATED APPLICATION(S)

The present description is based on Japanese Patent Application No. 2022-109426 filed on Jul. 7, 2022. The entire contents thereof are incorporated herein.

TECHNICAL FIELD

The present invention relates to a motion guide apparatus in which a turn portion has a three-dimensional trajectory.

BACKGROUND ART

A motion guide apparatus for guiding rectilinear or curvilinear motion of a movable body such as a table is known (refer to Patent Literature 1). The motion guide apparatus includes a rail member, and a block that is movable relative to the rail member. A rolling path is formed between a rolling portion of the rail member and a rolling portion of the block. The rolling path, a return portion, and turn portions connected to the rolling path and the return portion form a circulation path. A plurality of rolling elements is placed in the circulation path.

In a general motion guide apparatus, a trajectory of the rolling path is straight. A trajectory of the return portion is also straight. A trajectory of each of the turn portions connected to the rolling path and the return portion is an arc. The trajectory of each of the turn portions as viewed in a longitudinal direction (Y direction) of the motion guide apparatus, that is, the trajectory of each of the turn portions in an X-Z cross section of the motion guide apparatus, is straight.

CITATION LIST

Patent Literature

Patent Literature 1: JP-A-2020-197296

SUMMARY OF INVENTION

Technical Problem

However, as illustrated in FIG. 8(*a*), the trajectory of the turn portion in the X-Z cross section of the motion guide apparatus may be a curve due to, for example, a constraint on the shape of the rail member and a constraint on the shape of the turn portion. In this case, the trajectory of the turn portion is a three-dimensional trajectory that is three-dimensional and complex.

The inventor devised an idea of forming a three-dimensional trajectory that is three-dimensional and complex as follows. In other words, a trajectory curve (a cross-sectional trajectory curve 21) of the turn portion in the X-Z cross section illustrated in FIG. 8(*a*) is swept in a Y-axis direction to draw a curved surface 22 as illustrated in FIG. 9. Similarly, a trajectory curve 23 (a longitudinal trajectory curve) of the turn portion in the Y-Z cross section illustrated in FIG. 8(*b*) is swept in an X-axis direction to draw a curved surface 24 (indicated by hatching in FIG. 9) as illustrated in FIG. 9. These two curved surfaces 22 and 24 are then superimposed, and a curve 25 where the two curved surfaces 22 and 24 intersect with each other is set as the three-dimensional trajectory. Note that in FIGS. 8(*a*), 8(*b*), and 9, a reference sign 31 denotes the rail member, a reference sign 32 denotes the block, a reference sign 33 denotes the rolling element, a reference sign 34 denotes a start point of the turn portion, a reference sign 35 denotes an end point of the turn portion, a reference sign 36 denotes the trajectory of the rolling path, and a reference sign 37 denotes the trajectory of the return portion.

However, the three-dimensional trajectory 25 of the turn portion formed in this manner has a problem that tangent lines thereto are not continuous with a straight line to be the trajectory 36 of the rolling path and a straight line to be the trajectory 37 of the return portion at the start point 34 and the end point 35. Hence, the movement of the rolling elements may be deteriorated, the repeated durability of the turn portion may decrease, and noise may be generated.

The present invention has been made in view of the above problems, and an object thereof is to provide a motion guide apparatus in which even if at least part of a turn portion is a three-dimensional trajectory that is three-dimensional and complex, it is possible to approach at least one of a rolling path and a return portion substantially along a tangent line.

Solution to Problem

In order to solve the above problems, the present invention is a motion guide apparatus including: a rail member; a block configured to be movable relative to the rail member; and a plurality of rolling elements placed in a rolling path between a rolling portion of the rail member and a rolling portion of the block, a return portion, and a turn portion connected to the rolling path and the return portion, in which at least part of a three-dimensional trajectory of the turn portion is formed on the basis of a cross-sectional trajectory curve in the X-Z cross section of the motion guide apparatus, and a longitudinal trajectory curve drawn on a virtual plane where a longitudinal direction of the motion guide apparatus is a Y-axis, and a trajectory length ω from a turn start point of the cross-sectional trajectory curve is a length ω of a W-axis, X and Z coordinates of the three-dimensional trajectory are X and Z coordinates of the cross-sectional trajectory curve, and a Y-coordinate of the three-dimensional trajectory is a Y-coordinate of the longitudinal trajectory curve where the ω of the W-axis of the virtual plane is a variable.

Advantageous Effects of Invention

According to the present invention, even if at least part of a turn portion is a three-dimensional trajectory that is three-dimensional and complex, it can approach at least one of a rolling path and a return portion substantially along a tangent line. Therefore, it is possible to encourage an improvement in the movement of the rolling elements, an improvement in the repeated durability of the turn portion, and noise reduction.

DESCRIPTION OF EMBODIMENTS

Embodiments of a motion guide apparatus according to the present invention are described in detail hereinafter with reference to the accompanying drawings. However, the motion guide apparatus according to the present invention can be embodied in various forms and is not limited to the embodiments described in the description. The embodiments are provided with the intention of enabling those skilled in the art to fully understand the invention by fully disclosing the description.

Figure 1:
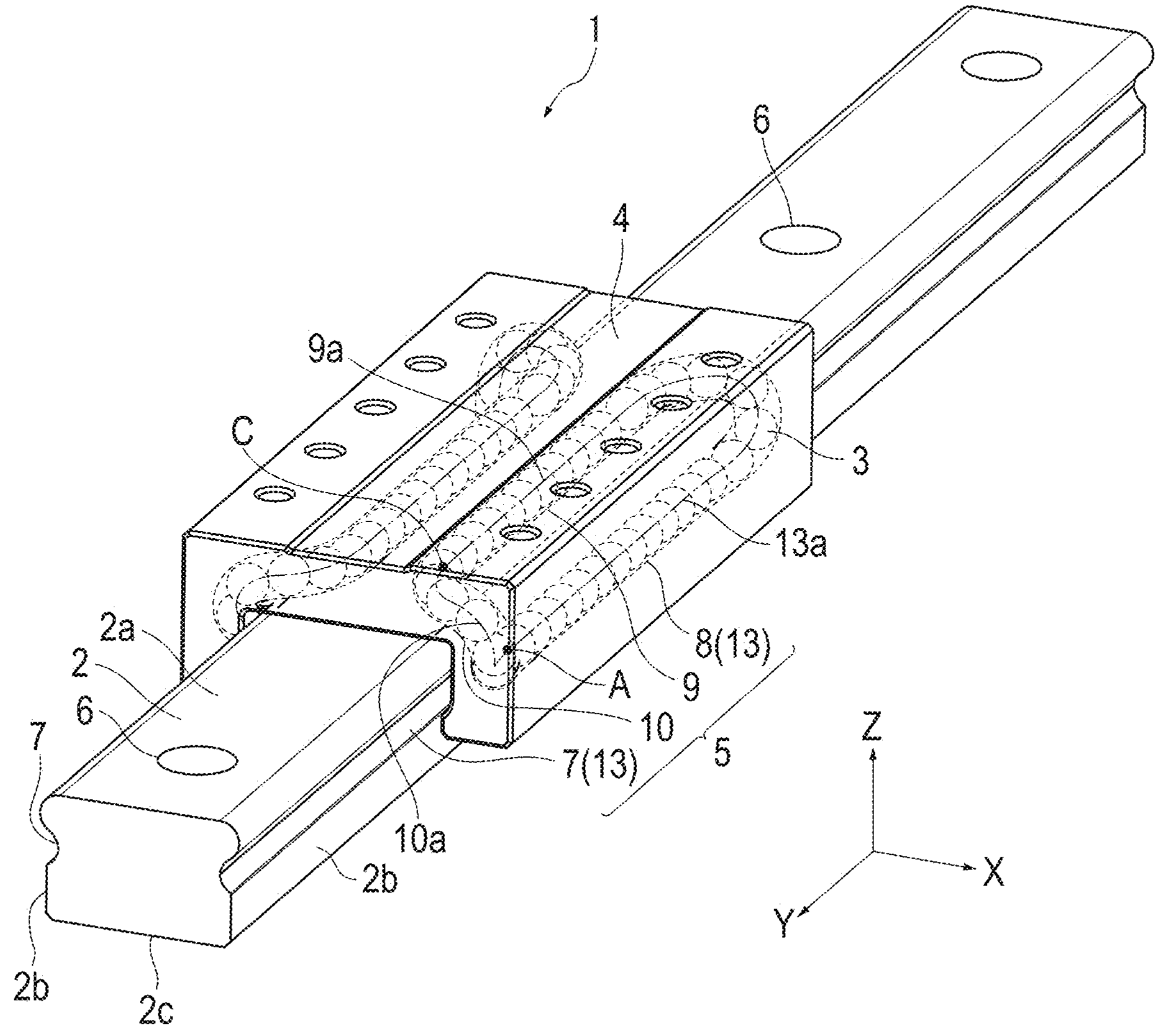
FIG. 1 is a perspective view of a motion guide apparatus of one embodiment of the present invention.
Figure 2:
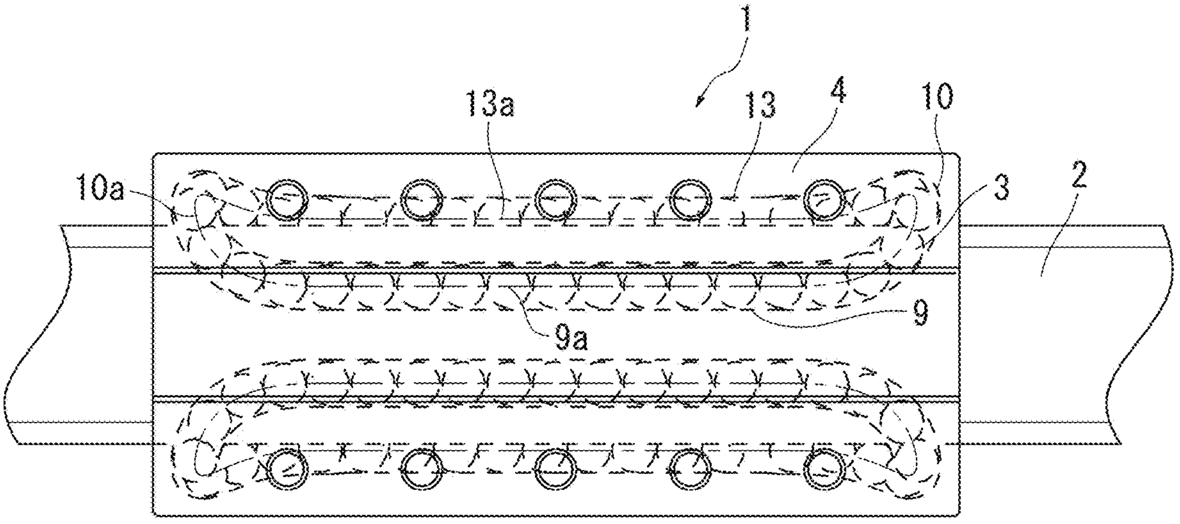
FIG. 2(*a*) is a plan view of the motion guide apparatus of the embodiment, and FIG. 2(*b*) is a side view.
Figure 2:
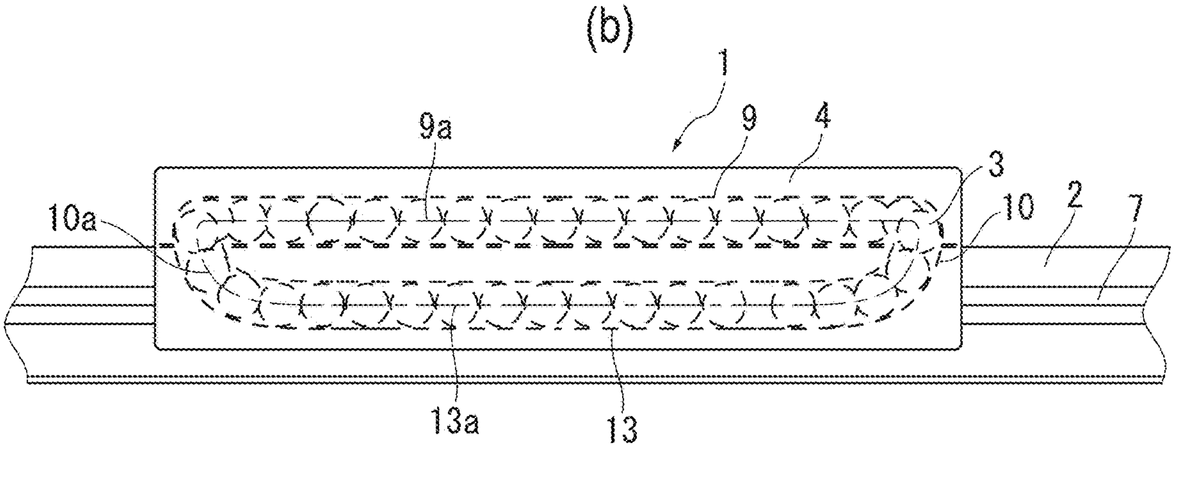
Figure 3:
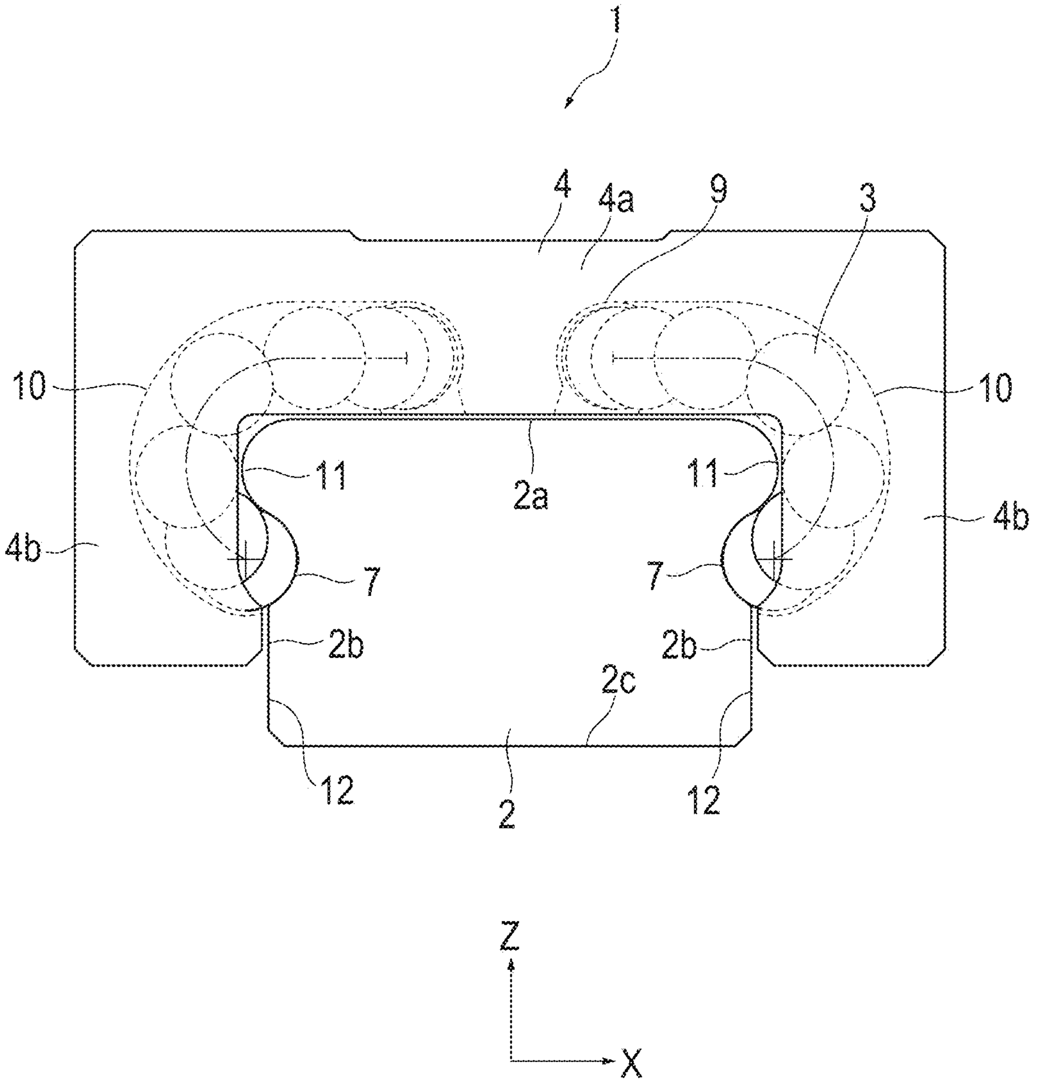
FIG. 3 is a front view of the motion guide apparatus of the embodiment.

FIG. 1 illustrates a perspective view of a motion guide apparatus 1 of one embodiment of the present invention. FIG. 2 illustrates a plan view and a side view of the motion guide apparatus 1 of the embodiment. FIG. 3 illustrates a front view of the motion guide apparatus 1 of the embodiment.

The motion guide apparatus 1 of the embodiment is a linear guide including a rail member 2, and a block 4 that is movable relative to the rail member 2. A plurality of balls 3 is interposed as rolling elements between the rail member 2 and the block 4 in such a manner as to be capable of rolling motion. The block 4 includes a circulation path 5 for circulating the plurality of balls 3. A rolling path 13 between a rolling portion 7 of the rail member 2 and a rolling portion 8 of the block 4, a return portion 9, and turn portions 10 form the circulation path 5.

Note that in the following description, a longitudinal direction of the rail member 2, that is, a travel direction of the block 4, is a Y-axis, a height direction is a Z-axis, and a horizontal direction is an X-axis.

As illustrated in FIG. 1, the rail member 2 is a rail extending linearly. The rail member 2 includes a top surface 2*a*, a pair of left and right side surfaces 2*b*, and an undersurface 2*c*. The rolling portion 7 extending in the longitudinal direction is formed on the side surface 2*b* of the rail member 2. The rolling portion 7 is a Gothic arch-shaped groove. The rolling portion 7 may be a circular arc-shaped groove. A plurality of mounting holes 6 for mounting the rail member 2 on a base is formed in the top surface 2*a* of the rail member 2. Note that the rail member 2 may extend in a curved path. The number of the rolling portions 7 can be set at, for example, two or four as appropriate. Moreover, the placement of the rolling portion 7 can also be set as appropriate.

As illustrated in FIG. 3, the block 4 has an approximately U shape in cross section and is placed in such a manner as to be astride the rail member 2. The block 4 includes a web portion 4*a* facing the top surface 2*a* of the rail member 2, and a pair of sleeve portions 4*b* that hangs down from two end portions in a left-and-right direction of the web portion 4*a* and faces the side surfaces 2*b* of the rail member 2. The block 4 of the motion guide apparatus 1 of the embodiment is a single structure. As illustrated in FIG. 1, the rolling portion 8, the return portion 9, and the turn portions 10 are formed in the block 4. The rolling portion 8 of the block 4 faces the rolling portion 7 of the rail member 2.

Figure 4:
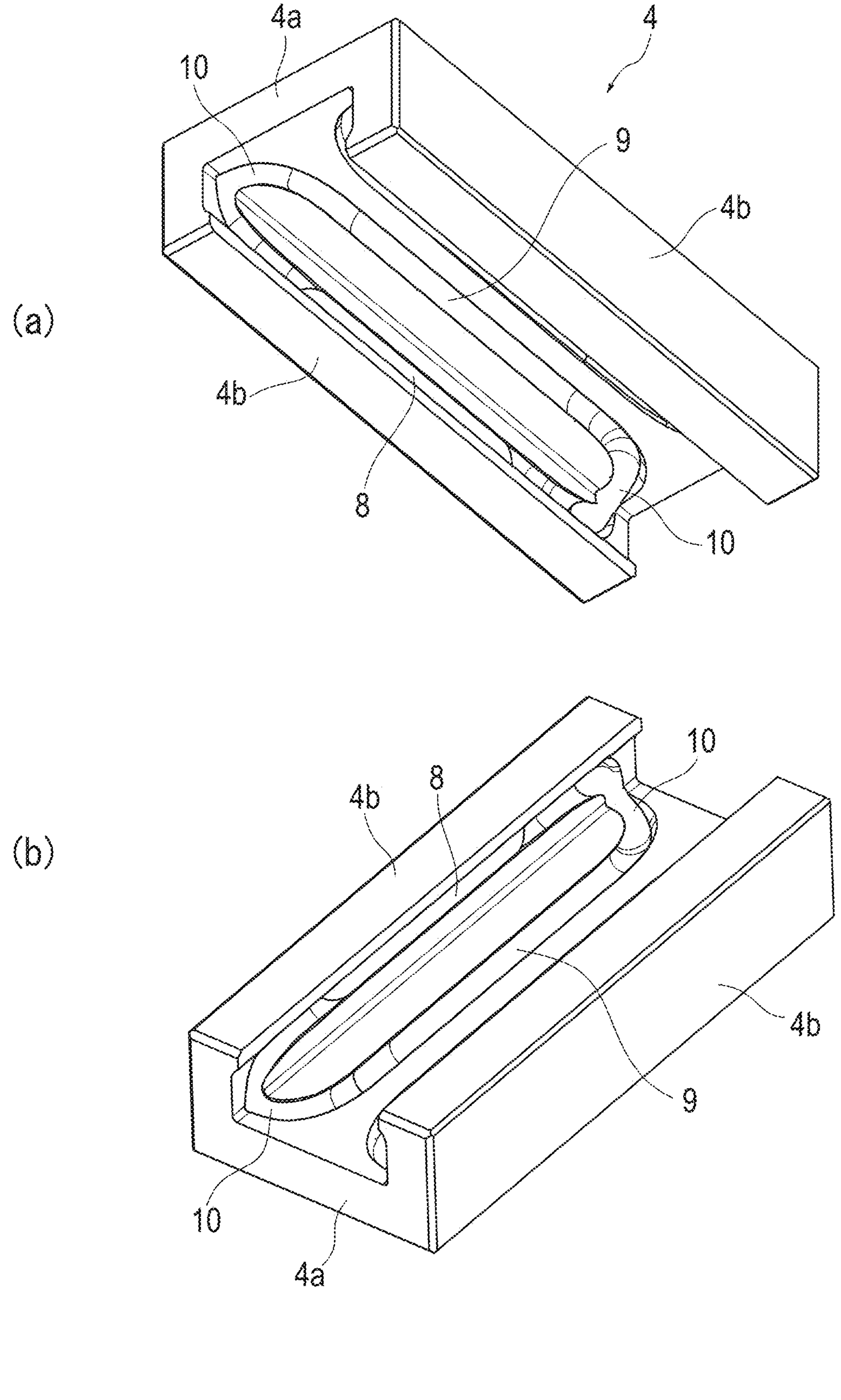
FIG. 4(*a*) is a bottom perspective view of a block of the embodiment, and FIG. 4(*b*) is a top perspective view of the inverted block of the embodiment.

FIG. 4(*a*) illustrates a bottom perspective view of the block 4, and FIG. 4(*b*) illustrates a top perspective view of the inverted block 4. The rolling portion 8 is formed in the sleeve portion 4*b* of the block 4. The rolling portion 8 is a Gothic arch-shaped groove. The rolling portion 8 may be a circular arc-shaped groove.

In the web portion 4*a* of the block 4, the return portion 9 is formed substantially parallel to the rolling portion 8. The return portion 9 is a groove that is open toward the rail member 2. Note that the return portion 9 may be a through-hole.

In the block 4, the turn portions 10 connected to the rolling portion 8 and the return portion 9 are formed from the sleeve portion 4*b* to the web portion 4*a* of the block 4. The turn portions 10 are grooves that are open toward the rail member 2. Note that the turn portions 10 may also be through-holes.

As illustrated in FIG. 3, in the motion guide apparatus 1 of the embodiment, of the pair of side surfaces 11 and 12 of the rail member 2 outside the rolling portion 7, the side surface 11 that is on the upper side in the Z direction and comes into contact with the balls 3 protrudes toward the block 4 more than the side surface 12 that is on the lower side and does not come into contact with the balls 3. The cross-sectional shape of the upper side surface 11 of the rail member 2 is an approximately arc shape. The turn portions 10 of the block 4 curve along the upper side surface 11. Moreover, the turn portions 10 extend straight along the top surface 2*a* of the rail member 2. In other words, the turn portions 10 are each formed by a combination of an arc and a straight line, and have an approximately J shape.

Figure 5:
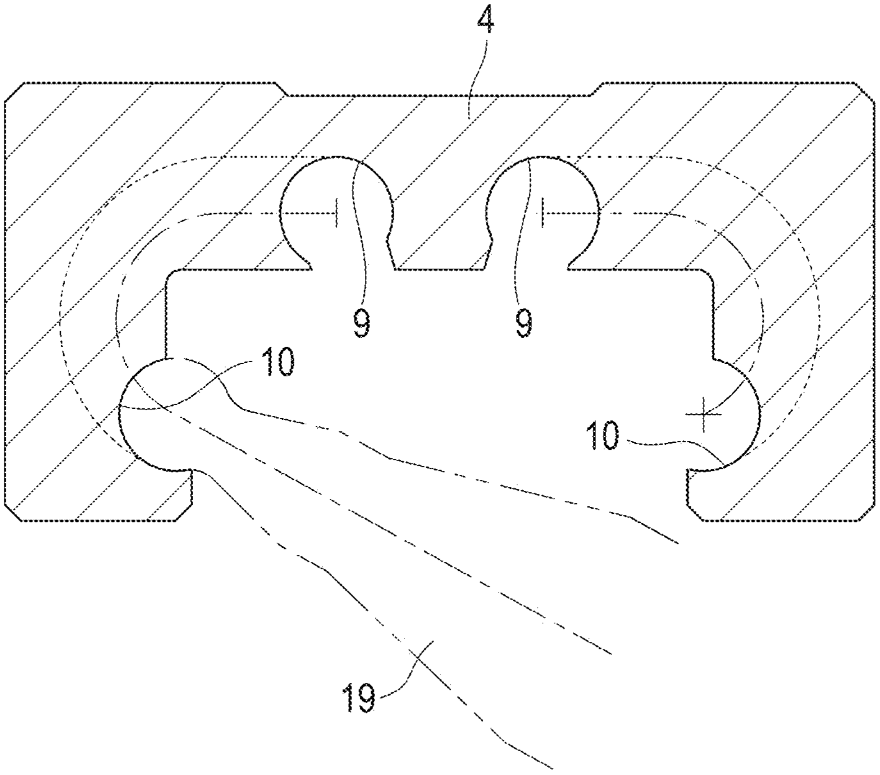
FIG. 5 is a schematic diagram illustrating a block processing method of the embodiment.

As illustrated in FIG. 5, the rolling portion 8 (refer to FIG. 4), the return portion 9, and the turn portions 10 of the block 4 are continuously formed in the block 4 using a cutting tool 19 such as an end mill. Connecting portions of the rolling portion 8, the turn portions 10, and the return portion 9 are seamless, and there are no joints. Note that the cutting tool 19 is not limited to an end mill. Moreover, the rolling portion 8, the turn portions 10, and the return portion 9 may be continuously formed in the block 4 by plasticity processing such as forging or pressing other than cutting.

Referring back to FIGS. 1 and 2, the plurality of balls 3 is placed in the circulation path 5 including the rolling path 13, the return portion 9, and the turn portions 10. When the block 4 is moved relative to the rail member 2, the balls 3 roll along the rolling path 13. The balls 3 that have moved to one end of the rolling path 13 are guided to the turn portion 10, move in an opposite direction along the return portion 9, and then are guided from the other turn portion 10 to the other end of the rolling path 13.

The rolling path 13 has a straight trajectory 13*a*. The return portion 9 also has a straight trajectory 9*a*. The turn portions 10 each have a three-dimensional trajectory 10*a* that is three-dimensional and complex. Note that the trajectories 13*a*, 9*a*, and 10*a* of the rolling path 13, the return portion 9, and the turn portions 10 are center lines of these paths. In the return portion 9, there is a slight play between the balls 3 and a wall surface of the return portion 9. The trajectory 9*a* of the return portion 9 is a center line of the return portion 9. In parts of the rolling path 13 and the turn portions 10, the balls 3 move while being sandwiched between the rail member 2 and the block 4. Parts of the trajectories 13*a* and 10*a* of the rolling path 13 and the turn portions 10 may be lines drawn by centers of the travelling balls 3.

A method for forming the three-dimensional trajectory 10*a* of the turn portion 10 is described below. The three-dimensional trajectory 10*a* of the turn portion 10 is formed on the basis of a cross-sectional trajectory curve 14 (refer to FIG. 6(*a*)) in the X-Z cross section of the motion guide apparatus 1, and a longitudinal trajectory curve 15 (refer to FIG. 6(*b*)) drawn on a virtual plane VP where the longitudinal direction of the motion guide apparatus 1 is the Y-axis and a length ω of the cross-sectional trajectory curve 14 is the length ω of a W-axis.

Figure 6:
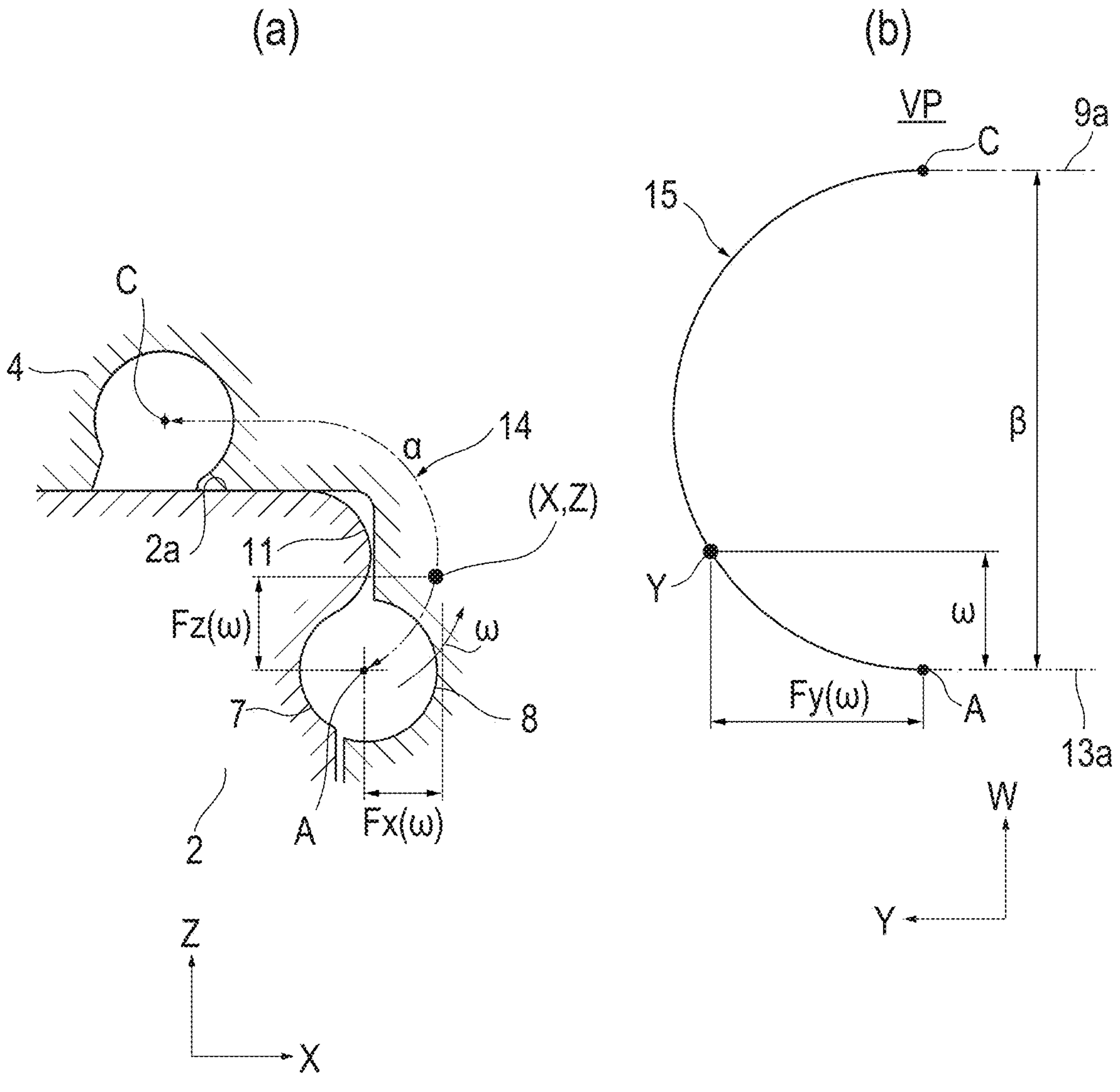
FIG. 6(*a*) illustrates a cross-sectional trajectory curve of the embodiment, and FIG. 6(*b*) illustrates a longitudinal trajectory curve of the embodiment.

As illustrated in FIG. 6(*a*), the cross-sectional trajectory curve 14 is a curve indicating the actual path of the trajectory along which the balls 3 circulate, in the X-Z cross section of the motion guide apparatus 1. A is a turn start point, and C is a turn end point. The cross-sectional trajectory curve 14 is determined in advance due to, for example, a constraint on the shape of the rail member 2 and a constraint on the shape of the turn portions 10. For example, in this embodiment, the cross-sectional trajectory curve 14 is determined in advance due to the constraint on the shape of the rail member 2, and is formed by connecting a single arc and a straight line in such a manner that the balls 3 can move along the side surface 2*b* and the top surface 2*a* of the rail member 2. Naturally, the cross-sectional trajectory curve 14 is not limited to the above, and may be formed by connecting a plurality of arcs having different curvatures instead of a single arc. Moreover, the cross-sectional trajectory curve 14 may be formed only by, for example, an arc, an ellipse, a clothoid curve, or a spline curve instead of connecting an arc and a straight line.

As illustrated in FIG. 6(*b*), the longitudinal trajectory curve 15 is a curve of which the trajectory direction is reversed 180°. A is a turn start point, and C is a turn end point. The longitudinal trajectory curve 15 is connected to the trajectory 13*a* of the rolling path 13 and the trajectory 9*a* of the return portion 9. The trajectory 13*a* of the rolling path 13 and the trajectory 9*a* of the return portion 9 are straight and parallel to the Y-axis. A turn trajectory width β of the longitudinal trajectory curve 15, that is, a distance between the trajectory 13*a* of the rolling path 13 and the trajectory 9*a* of the return portion 9, is equal to a total trajectory length α (refer to FIG. 6(*a*)) of the cross-sectional trajectory curve 14.

The Y-axis of the virtual plane VP is the longitudinal direction of the motion guide apparatus 1, that is, a relative travel direction of the block 4. The W-axis of the virtual plane VP is different from the Z-axis of the motion guide apparatus 1. The variable w of the W-axis is not a length in the Z-axis direction of the motion guide apparatus 1 but the trajectory length ω (refer to FIG. 6(*a*)) from the turn start point A of the cross-sectional trajectory curve 14. If the cross-sectional trajectory curve 14 is, for example, an arc, the trajectory length ω is the arc length.

The longitudinal trajectory curve 15 is, for example, a curve in which a tangent line to a single arc etc. is continuous. The longitudinal trajectory curve 15 may be a curve in which a tangent line to, for example, an ellipse, a clothoid curve, or a spline curve is continuous.

The longitudinal trajectory curve 15 is connected to the trajectory 13*a* of the rolling path 13 in such a manner that a tangent line thereto is substantially continuous with the trajectory 13*a* at the turn start point A. Moreover, the longitudinal trajectory curve 15 is connected to the trajectory 9*a* of the return portion 9 in such a manner that a tangent line thereto is substantially continuous with the trajectory 9*a* at the turn end point C. Note that it is desirable that the longitudinal trajectory curve 15 be connected to the trajectory 13*a* of the rolling path 13 and the trajectory 9*a* of the return portion 9 in such a manner that the tangent lines are continuous with the trajectories 13*a* and 9*a* respectively, but may be connected to the trajectory 13*a* of the rolling path 13 and the trajectory 9*a* of the return portion 9 in such a manner that the tangent line is continuous with at least one of the trajectories 13*a* and 9*a*.

Let the horizontal direction of the motion guide apparatus 1 be an X-coordinate, let the height direction be a Z-coordinate, and let the longitudinal direction be a Y-coordinate. The coordinates of the three-dimensional trajectory 10*a* of the turn portion 10 are expressed by the following continuous X, Y, and Z coordinates using the trajectory length ω from the turn start point A of the cross-sectional trajectory curve 14.

(Equation 1)

$$(X, Y, Z) = (F_X(\omega), F_Y(\omega), F_Z(\omega)) \tag{1}$$

Here, the X and Z coordinates of the three-dimensional trajectory 10*a* are the X and Z coordinates ($F_X(\omega)$, $F_Z(\omega)$) of the cross-sectional trajectory curve 14. The Y-coordinate of the three-dimensional trajectory 10*a* is the Y-coordinate ($F_Y(\omega)$) of the longitudinal trajectory curve 15 where ω of the W-axis of the virtual plane VP is a variable.

An example of the method for forming the three-dimensional trajectory 10*a* is described below. As illustrated in FIG. 6(*a*), the X and Z coordinates of the three-dimensional trajectory 10*a* are the coordinates ($F_X(\omega)$, $F_Z(\omega)$) of the cross-sectional trajectory curve 14 where the trajectory length ω from the turn start point A is a variable.

Figure 7:
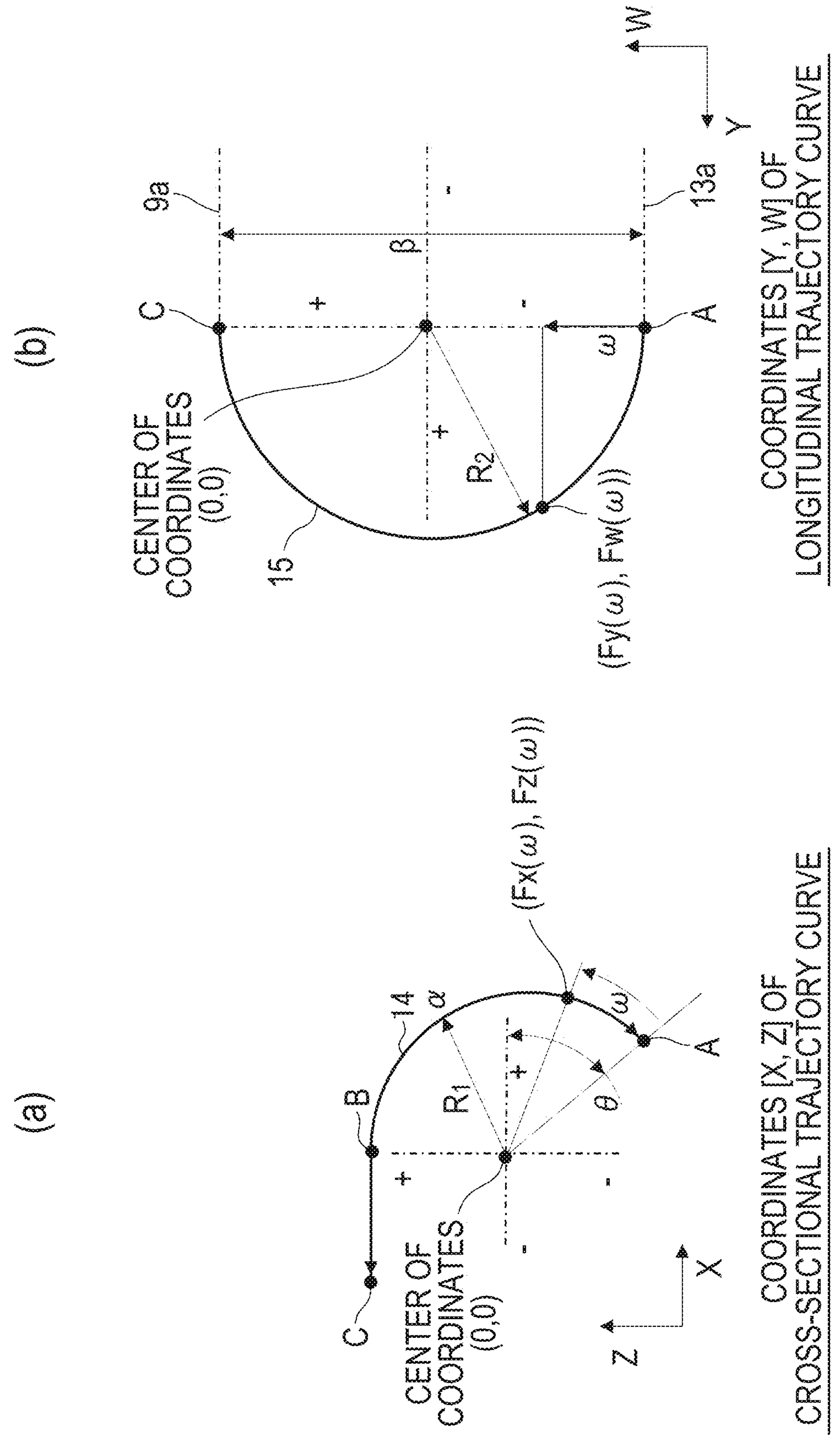
FIG. 7(*a*) illustrates the cross-sectional trajectory curve of the embodiment, and FIG. 7(*b*) illustrates the longitudinal trajectory curve of the embodiment.
Figure 8:
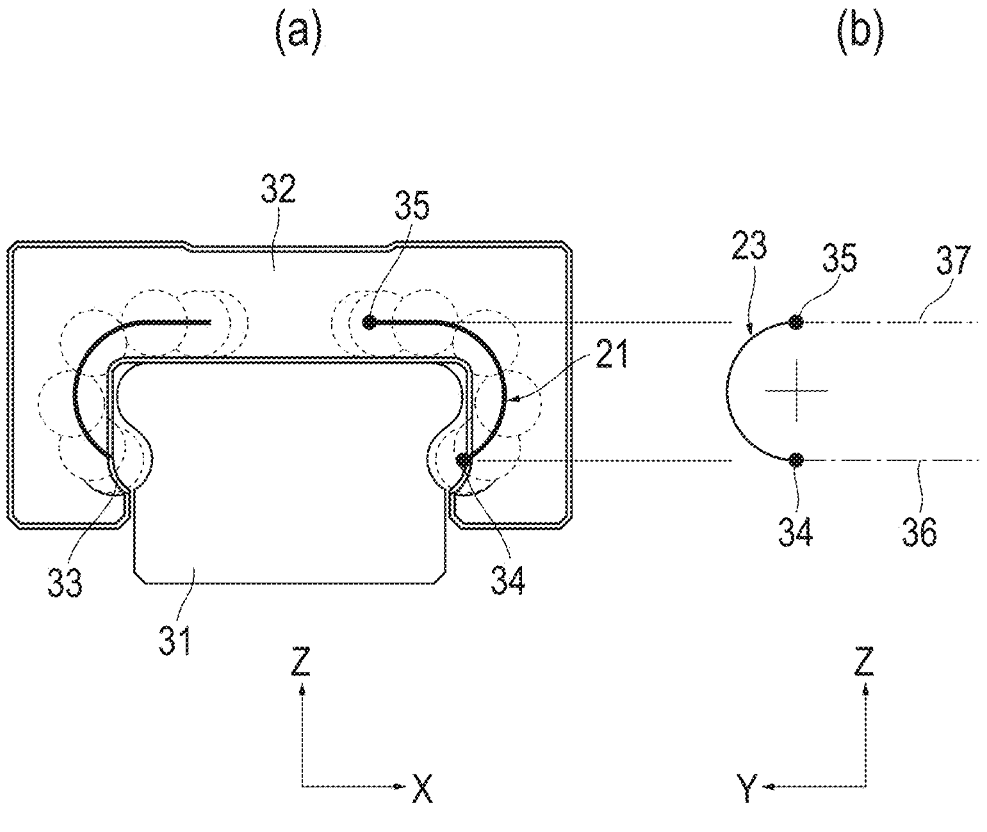
FIG. 8 is diagrams explaining a method for forming a turn portion of the motion guide apparatus of a comparative example (FIG. 8(*a*) illustrates a cross-sectional trajectory curve in the X-Z cross section, and FIG. 8(*b*) illustrates a longitudinal trajectory curve in the Y-Z cross section).
Figure 9:
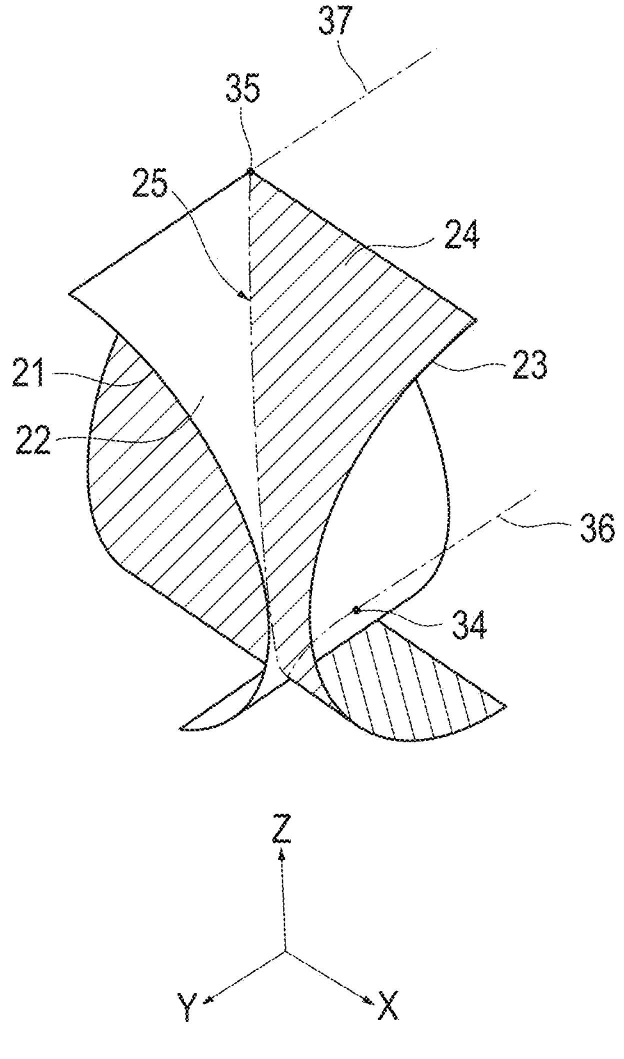
FIG. 9 is a diagram explaining the method for forming the turn portion of the motion guide apparatus of the comparative example (a perspective view illustrating an example in which two swept curved surfaces are superimposed).

If the cross-sectional trajectory curve 14 is formed by connecting an arc and a straight line as illustrated in FIG. 7(*a*), the X and Z coordinates of the cross-sectional trajectory curve 14 are expressed as follows:

(Equation 2)

$$(X, Z) = (F_X(\omega), F_Z(\omega)) \tag{2}$$

In a section from $A$ to $B$, $$F_x(\omega) = \sqrt{\frac{R_1^2}{1 + \tan^2\left(\frac{\omega}{R_1} - \theta\right)}}$$

$$F_Z(\omega) = \tan\left(\frac{\omega}{R_1} - \theta\right) \times \sqrt{\frac{R_1^2}{1 + \tan^2\left(\frac{\omega}{R_1} - \theta\right)}}$$

In a section from $B$ to $C$, $$F_x(\omega) = R_1 \times \left(\frac{\pi}{2} + \theta\right) - \omega$$

$$F_Z(\omega) = R_1$$

Here, A is the turn start point, B is the curvature change point on the cross-sectional trajectory curve, and C is the turn end point. ω is the trajectory length from the turn start point A, and is a variable that changes from 0 to α. θ is the turn start angle, $R_1$ is the cross-sectional trajectory radius, and a is the total cross-sectional trajectory length.

As illustrated in FIG. 6(*b*), the Y-coordinate of the three-dimensional trajectory 10*a* is the Y-coordinate ($F_Y(\omega)$) of the longitudinal trajectory curve 15 where ω of the W-axis of the virtual plane VP is a variable.

If the longitudinal trajectory curve 15 is formed by a single arc as illustrated in FIG. 7(*b*), the Y-coordinate of the three-dimensional trajectory 10*a* is expressed as follows:

(Equation 3)

$$Y = F_Y(\omega) \tag{3}$$

In a section from $A$ to $C$, $$F_Y(\omega) = -\omega^2 + 2 \times R_2 \times \omega$$

$$F_W = \omega - R_2$$

where $R_2$ is the longitudinal trajectory radius, and $R_2=\alpha/2$.

The X, Y, and Z coordinates of the three-dimensional trajectory 10*a* taking a variable as the trajectory length ω from the turn start point A can be obtained from $F_X(\omega)$, $F_Z(\omega)$ of equation (2) and $F_Y(\omega)$ of equation (3). Note that $F_W$ in equation (3) is not used to obtain the coordinates of the three-dimensional trajectory 10*a*, but is referred to for reference.

FIG. 1 illustrates the three-dimensional trajectory 10*a* of the turn portion 10 formed on the basis of the cross-sectional trajectory curve 14 and the longitudinal trajectory curve 15. The three-dimensional trajectory 10*a* is formed in this manner, so that even if the three-dimensional trajectory 10*a* is a three-dimensional and complex trajectory, it can be connected to the trajectory 13*a* of the rolling path 13 in such a manner that the tangent line is substantially continuous with the trajectory 13*a* at the turn start point A. Moreover, the three-dimensional trajectory 10*a* can be connected to the trajectory 9*a* of the return portion 9 in such a manner that the tangent line is substantially continuous with the trajectory 9*a* at the turn end point C.

Up to this point, the configuration of the motion guide apparatus 1 of the embodiment has been described. The motion guide apparatus 1 of the embodiment has the following effects:

At least part of the three-dimensional trajectory 10*a* of the turn portion 10 is formed on the basis of the cross-sectional trajectory curve 14 and the longitudinal trajectory curve 15 of the motion guide apparatus 1. Therefore, even if at least part of the turn portion 10 is a three-dimensional trajectory that is three-dimensional and complex, it can approach at least one of the rolling path 13 and the return portion 9 substantially along the tangent line. Hence, it is possible to encourage an improvement in the movement of the balls 3, an improvement in the repeated durability of the turn portion 10, and noise reduction.

On the virtual plane VP, the longitudinal trajectory curve 15 is connected to at least one of the trajectory 13*a* of the rolling path 13 and the trajectory 9*a* of the return portion 9 in such a manner that the tangent line is continuous with the at least one of the trajectories 13*a* and 9*a*. Therefore, the three-dimensional trajectory 10*a* of the turn portion 10 can be connected to at least one of the rolling path 13 and the return portion 9 in such a manner that the tangent line is continuous with the at least one of the rolling path 13 and the return portion 9.

The turn trajectory width (β) of the longitudinal trajectory curve 15 is equal to the total trajectory length (α) of the cross-sectional trajectory curve 14. Therefore, the three-dimensional trajectory 10*a* of the turn portion 10 can be smoothly formed along its entire length.

At least the rolling portion 8 and the turn portions 10 are continuously formed in the block 4 that is a single structure, and therefore, can be joined together seamlessly.

Note that the present invention is not limited to concretization of the above embodiment, and can be concretized in other embodiments within the scope that does not change the purport of the present invention.

In the above embodiment, the cross-sectional trajectory curve in the X-Z cross section of the motion guide apparatus includes a curve and a straight line, but may include only a curve. Moreover, in the above embodiment, the longitudinal trajectory curve on the virtual plane of the motion guide apparatus includes only a curve, but may partially include a straight line.

In the above embodiment, the rolling portion and the turn portions are formed in the block that is a single structure. However, the block may include a block body and lid members that are mounted on end surfaces of the block body, the rolling portion may be formed in the block body, and the turn portions may be formed in the lid members. In this case, as in a general linear guide, for example, two or four rolling portions may be formed in the block body, for example, two or four turn portions may be formed in each of the lid members, and the return portions of the block body may be placed in the sleeve portions of the block body. Moreover, the return portions of the block body may be formed as through-holes in such a manner as to have a closed cross section, or the lid members may each include an end plate and an inner piece in such a manner that the turn portions of the lid members have a closed cross section.

In the above embodiment, the example of a full ball type has been described. However, a spacer may be interposed between the balls. Moreover, the example in which the rolling elements are balls has been described. However, the rolling elements may be rollers.

In the above embodiment, the example of the outer block type linear guide in which the block having an approximately U shape in cross section is astride the rail member has been described. However, an inner block type linear guide may be used in which an inner block is placed in an outer rail having an approximately U shape in cross section.

In the above embodiment, the example in which the motion guide apparatus is a linear guide has been described. However, the motion guide apparatus may be a ball spline.

REFERENCE SIGNS LIST

1 Motion guide apparatus
2 Rail member
3 Ball (rolling element)
4 Block
7 Rolling portion of rail member
8 Rolling portion of block
9 Return portion
9*a* Trajectory of return portion
10 Turn portion
10*a* Three-dimensional trajectory of turn portion
13 Rolling path
13*a* Trajectory of rolling path
14 Cross-sectional trajectory curve
15 Longitudinal trajectory curve
VP Virtual plane

The invention claimed is:

1. A motion guide apparatus comprising:

a rail member;

a block configured to be movable relative to the rail member; and a plurality of rolling elements placed in a rolling path between a rolling portion of the rail member and a rolling portion of the block, a return portion, and a turn portion connected to the rolling path and the return portion, wherein a three-dimensional trajectory of the turn portion is formed on the basis of a cross-sectional trajectory curve in an X-Z cross section of the motion guide apparatus, and a longitudinal trajectory curve drawn on a virtual plane where a longitudinal direction of the motion guide apparatus is a Y-axis, and a trajectory length ω from a turn start point of the cross-sectional trajectory curve along the cross-sectional trajectory curve is a length ω of a W-axis, the cross-sectional trajectory curve is a curve indicating an actual path of a trajectory along which the rolling elements circulate from the turn start point to a turn end point, in the X-Z cross section of the motion guide apparatus, the longitudinal trajectory curve is a curve of which a trajectory direction of the rolling elements is reversed 180° from the turn start point to the turn end point on the virtual plane, the W-axis of the virtual plane extends in such a manner as to be orthogonal to the Y-axis of the motion guide apparatus and along the cross-sectional trajectory curve, X and Z coordinates of the three-dimensional trajectory of the turn portion from the turn start point to the turn end point are X and Z coordinates from the turn start point to the turn end point of the cross-sectional trajectory curve in the X-Z cross section, a Y-coordinate of the three-dimensional trajectory of the turn portion from the turn start point to the turn end point is a Y-coordinate of the Y-axis from the turn start point to the turn end point of the longitudinal trajectory curve where the ω of the W-axis of the virtual plane is a variable, the longitudinal trajectory curve is connected to at least one of a trajectory of the rolling path and a trajectory of the return portion in such a manner that a tangent line thereto is continuous with the at least one of the trajectories on the virtual plane, and a turn trajectory width (β) from the turn start point to the turn end point of the longitudinal trajectory curve on the virtual plane is equal to a total trajectory length (α) along the cross-sectional trajectory curve from the turn start point to the turn end point of the cross-sectional trajectory curve in the X-Z cross section.

2. The motion guide apparatus according to claim 1, wherein at least the rolling portion and the turn portion are continuously formed in the block.

* * * * *